United States Patent
Wigren et al.

(10) Patent No.: US 11,044,001 B2
(45) Date of Patent: Jun. 22, 2021

(54) STEERING VECTOR WEIGHTING

(71) Applicant: Telefonaktiebolaget LM Ericsson (publ), Stockholm (SE)

(72) Inventors: Torbjörn Wigren, Uppsala (SE); Ari Kangas, Lidingö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/954,586

(22) PCT Filed: Dec. 19, 2017

(86) PCT No.: PCT/SE2017/051297
§ 371 (c)(1),
(2) Date: Jun. 17, 2020

(87) PCT Pub. No.: WO2019/125240
PCT Pub. Date: Jun. 27, 2019

(65) Prior Publication Data
US 2020/0336191 A1    Oct. 22, 2020

(51) Int. Cl.
*H04B 7/06*  (2006.01)
*H04B 7/08*  (2006.01)

(52) U.S. Cl.
CPC ......... *H04B 7/0663* (2013.01); *H04B 7/0617* (2013.01); *H04B 7/0632* (2013.01); *H04B 7/0854* (2013.01)

(58) Field of Classification Search
CPC .. H04B 7/0417; H04B 7/0632; H04B 7/0639; H04B 7/0456; H04B 7/0617; H04B 7/0478; H04B 7/06; H04B 7/0626; H04B 7/0634; H04B 7/0663; H04B 7/0854
See application file for complete search history.

(56) References Cited

U.S. PATENT DOCUMENTS

| | | | |
|---|---|---|---|
| 8,243,610 B2* | 8/2012 | Rong | H04L 5/0023 370/251 |
| 8,964,870 B2* | 2/2015 | Taoka | H04B 7/0456 375/267 |
| 9,154,202 B2* | 10/2015 | Kotecha | H04B 7/0417 |
| 2005/0254477 A1* | 11/2005 | Lee | H04B 7/0626 370/342 |
| 2012/0051287 A1 | 3/2012 | Merlin et al. | |

(Continued)

FOREIGN PATENT DOCUMENTS

EP    2469729 A1    6/2012

*Primary Examiner* — Freshteh N Aghdam
(74) *Attorney, Agent, or Firm* — Murphy, Bilak & Homiller, PLLC (57) ABSTRACT

A method is provided. The method includes computing a beamforming weight matrix W; and using the beamforming weight matrix W to transmit and/or receive data. The beamforming matrix W is computed from a weighted channel estimate matrix Formulae (A): and a channel estimation error matrix Formulae (B): the weighted channel estimate matrix Formulae (C): satisfying a condition, and where $\hat{H}$ is a channel estimate matrix and ρ is a weighting factor matrix and ∘ denotes a matrix operation. The weighting factor matrix ρ is such that zeroes of the rows or columns of the weighted channel estimate matrix Formulae (C): are moved as compared to zeroes of the rows or columns of the channel estimate matrix $\hat{H}$.

12 Claims, 9 Drawing Sheets

(56) References Cited

U.S. PATENT DOCUMENTS

| | | | |
|---|---|---|---|
| 2013/0114468 A1* | 5/2013 | Hui | H04B 17/345 370/277 |
| 2016/0105230 A1* | 4/2016 | Sidiropoulos | H04B 7/0639 375/267 |
| 2018/0115381 A1* | 4/2018 | Lincoln | H04L 5/0051 |

* cited by examiner

STEERING VECTOR WEIGHTING

TECHNICAL FIELD

Disclosed are embodiments related to beamforming.

BACKGROUND

In the emerging 5G cellular systems, beamforming and MIMO transmission will be central technologies. The reason is that spectral resources are running out at low carrier frequencies which leads to a gradual migration into higher frequency bands, like the millimeter-wave ("mmw") band. There, beamforming and a use of massive antenna arrays are needed to achieve a sufficient coverage. There is, for example, plenty of available spectrum around 28 GHz and 39 GHz in the US and other markets. This spectrum needs to be exploited to meet the increasing capacity requirements. The 5G frequency migration is expected to start at 3.5-5 GHz, and then continue to these 28 GHz and 39 GHz bands that are expected to become available in the not-too-distant future.

In the following description, 3GPP terminology for the 4G LTE system is used (unless otherwise noted), since the standardization of the 5G counterparts are not yet finalized.

Beamforming and MIMO transmission is a mature subject today. This section presents the basics.

Figure 1:
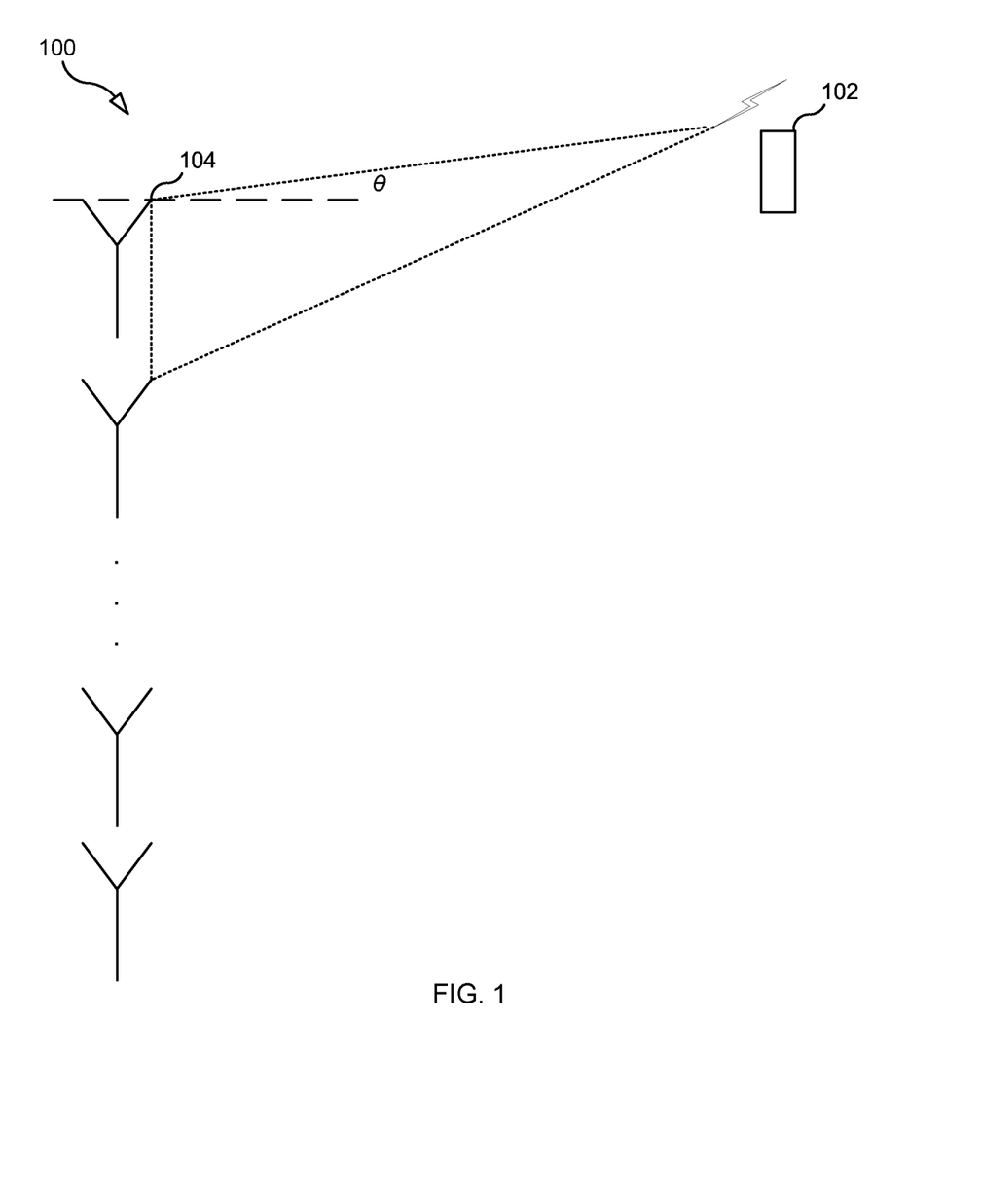
FIG. 1 illustrates shows an idealized, one-dimensional beamforming case.

To explain the beamforming concept, consider FIG. 1, which shows an idealized, one-dimensional beamforming case. In system 100, if it is assumed that the UE 102 is located far away from the antenna array 104 (e.g., found at a base station (BS)), then it follows that the difference in travel distance from the base station to the UE, between adjacent antenna elements, is $1=k\lambda \cdot \sin(\theta)$, where $k\lambda$ is the antenna element separation. Here k is the separation factor, which may for example be 0.5-0.7 in a typical correlated antenna element arrangement. This means that if a reference signal $s_i e^{-\omega t}$ is transmitted from the i-th antenna element, it will arrive at the user equipment (UE) antenna as a weighted sum:

$$s_{UE} = \sum_{i=0}^{N-1} s_i h_i e^{j\omega\left(t-\frac{il}{c}\right)} = e^{j\omega t} \sum_{i=0}^{N-1} s_i h_i e^{-j2\pi f_c \frac{ik\lambda \sin\theta}{f_c\lambda}} = e^{j\omega t} \sum_{i=0}^{N-1} s_i h_i e^{-j2\pi ik \sin\theta}.$$

Here $\omega$ is the angular carrier frequency; $h_i$ is the complex channel from the i-th antenna element; t is the time; and $f_c$ is the carrier frequency. In the above equation $\theta$ and $h_i$ are unknown. In case of a feedback solution, the UE therefore needs to search for all complex channel coefficients $h_i$ and the unknown angle $\theta$. For this reason, the standard defines a codebook of beams in different directions given by steering vector coefficients like $w_{m,i}=e^{-jf(m,i)}$, where m indicates a directional codebook entry, and where f( ) denotes a function. The UE then tests each codebook and estimates the channel coefficients. The information rate achieved for each codebook entry m is computed, and the best one defines the direction and channel coefficients. This is possible since $s_i$ is known. The result is then encoded and reported back to the base station. This provides the base station with a best direction (codebook entry) and information that allows it to build up a channel matrix H. This matrix represents the channel from each of the transmit antenna elements to each of the receive antenna elements. Typically, each element of H is represented by a complex number.

The channel matrix can then be used for beamforming computations, or the direction represented by the reported codebook entry can be used directly. In case of MIMO transmission, the MIMO beamforming weight matrix W needs to be determined, so that a best match, e.g. to the condition WH=I is achieved. I denotes the identity matrix. In case of an exact match, each layer will become independent of other layers. This concept can be applied for single users or multiple users.

Figure 2:
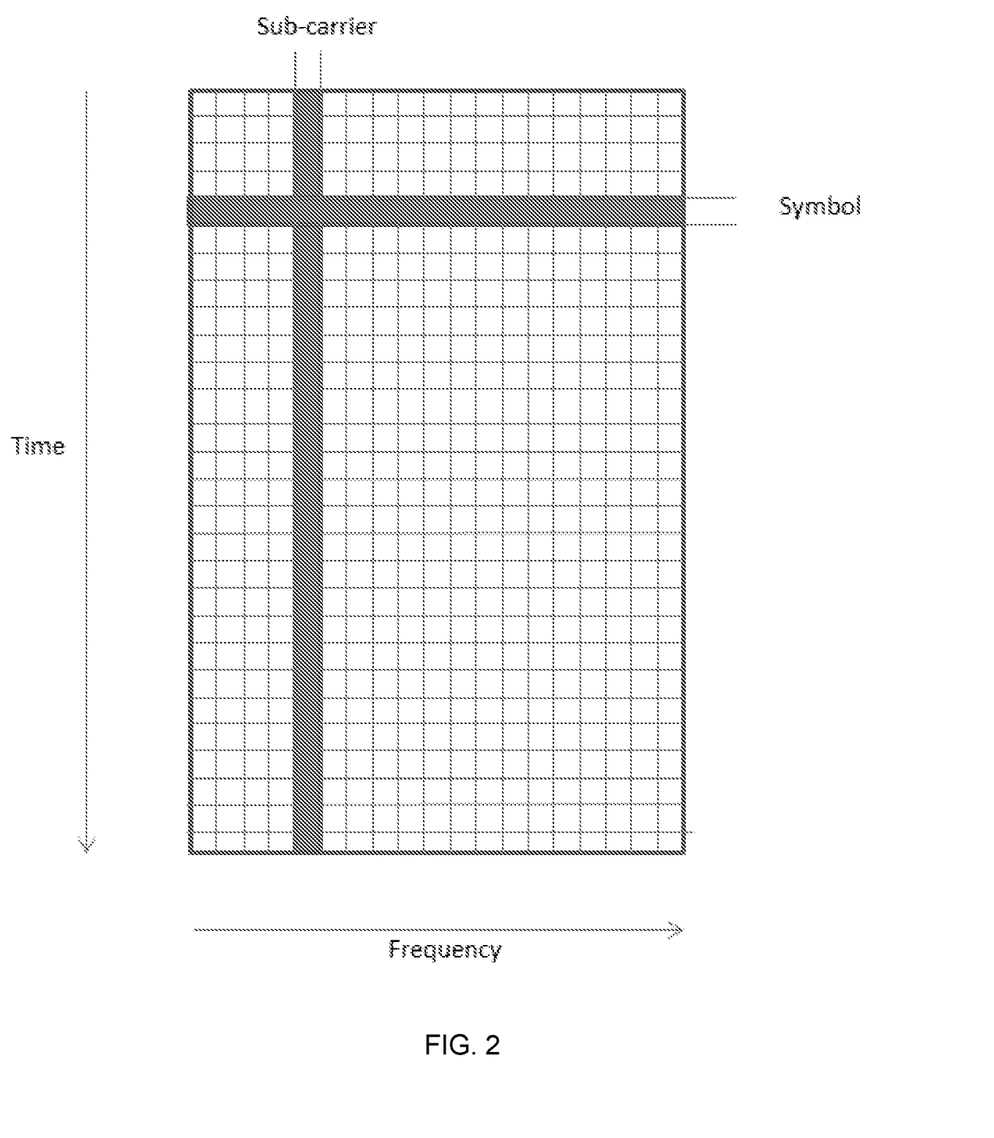
FIG. 2 illustrates a resource grid, divided in time and frequency.

The dominating multi-user access technology for 5G is expected to become some variant of orthogonal frequency division multiple access (OFDMA). As is well known, this access is associated with a resource grid, divided in time and frequency, as shown in FIG. 2. The resource grid provides a division in frequency defined by sub-carriers and a division in time by OFDM symbols. The product set of a subcarrier and an OFDM symbol forms a resource element and as in LTE, a time-frequency block of resource elements forms a resource block. The currently evolving 3GPP NR 5G standard recently also defined slots and mini-slots, giving additional addressing modes of time-frequency resources. When multi-layered (e.g., MIMO) transmission is used, there is one overlaid resource grid per layer, separated by spatial precoding.

Channel reciprocity is a consequence of Maxwell's Equations. Given two nodes equipped with antenna arrays that communicate in a single frequency band, the channel reciprocity property means that at any given point in time, the complex channel coefficient between any transmitting antenna element in one node and any receiving antenna element in the other node, is the same (to within a conjugation) in the uplink and the downlink. The channel matrix hence remains the same (to within a conjugation and transpose) between the antenna arrays of the two nodes when the direction of the transmission is reversed. The two nodes may typically be a UE and an eNB (or gNB in 5G). For reciprocity to hold, the time is assumed to be essentially the same for the two directions of transmission.

To exploit reciprocity, the channel coefficients can be directly estimated by the base station (e.g., eNB, gNB) from UE uplink transmission of known pilot signals, for example so called sounding reference signals, SRSs. The estimated channel can then be used to compute the combining weight matrix with a selected principle, and then used for downlink transmission. This works since the uplink and downlink channels are the same (to within a conjugate transpose) when reciprocity is valid.

One beamforming technique is known as Reciprocity Assisted Transmission (RAT). The RAT scheme is obtained as a Minimum Mean Square Error (MMSE) solution. To express the requirements on the beamforming weights, a desired situation may be expressed by the equation $$\hat{H}W + \tilde{H}W = 1 \tag{Eq. 1}$$

where $\hat{H}$ is the estimated channel matrix, of size $N_{rx}$ by $N_{tx}$ where $N_{rx}$ is the total number of receive antennas for all UEs and where $N_{tx}$ is the number of base station antennas; $\tilde{H}$ is the channel estimation error, which is assumed to have covariance matrix $\Gamma$; and I is the identity matrix.

As shown above, (Eq. 1) is valid for an arbitrary number of users and antenna elements. In order to find the beam weights (i.e., to solve for W), an MMSE criterion may be used; one criterion may be, for example, that E{WW*}=I, where W* represents the conjugate transpose (a.k.a. Hermitian transpose) of W (and likewise for other matrices). Using this criterion, the MMSE estimate of W becomes $$W = \hat{H}(\hat{H}\hat{H}^* + \Gamma)^{-1} \tag{Eq. 2}$$

Beamforming implies transmitting the same signal from multiple antenna elements of an antenna array with an amplitude and/or phase shift applied to the signal for each antenna element. These amplitude/phase shifts are commonly denoted as the antenna weights and the collection of the antenna weights for each of the antennas is a precoding vector.

Different precoding vectors give rise to a beamforming of the transmitted signal and the weights can be controlled so that the signals are coherently combining in a certain angle direction as seen from the antenna array in which case it is said that a transmit (Tx) beam is formed in that direction. Hence, in some contexts, when we refer to a beam we are referring to a particular precoding vector (a.k.a., "beamforming weights"). If the antennas of the array are placed in two dimensions, i.e. in a plane, then the beam can be steered in both azimuth and elevation directions with respect to the plane perpendicular to the antenna array.

SUMMARY

Embodiments provide for improved ways to address beamforming opportunities that arise in both the high mmw frequency bands and the lower 5G bands, below 6 GHz. A major problem in these contexts arises from so-called phase noise that affects the spatial multidimensional channel, that is obtained and estimated in the radio receivers. The reason can be explained as follows. When antenna arrays with many elements are used to enhance coverage and capacity, the transmission lobes and zeroes that arise in the spatial domain become more narrow, meaning that the angular extension of a high gain beam or low gain zero becomes smaller. The phase noise affecting the angular channel estimation accuracy, however, remains essentially the same. This results in an increase of the sensitivity to phase noise, with increasing antenna array size. This means that advanced transmission schemes (such as RAT) that apply null-forming to reduce interference in e.g. multi-user multiple input multiple output (MU-MIMO) transmission may fail in cases where the phase noise becomes too high relative to the antenna array size and the applied transmission scheme. A secondary consequence is reduced coverage and reduced capacity of the cellular system. Accordingly, it is advantageous to mitigate these effects, e.g. by making the transmission schemes less aggressive and thereby more stable. Such stability may e.g. be beneficial for the link adaptation functionality that often applies temporal filtering and prediction in support of the scheduling of data traffic of multiple users in a cell. Embodiments provide such mitigation, and make the transmission scheme (e.g., RAT) less aggressive and thereby more stable.

Embodiments also provide for smoothing the antenna array beam pattern, thereby making the estimated channel quality in different directions more stable. Embodiments provide for a modified RAT transmission scheme, e.g. by providing for modifications to the quantities upon which the transmission scheme is based, such as the so called steering vectors. Additional advantages of embodiments include modifications that can be implemented with a low computational complexity.

Figure 3:
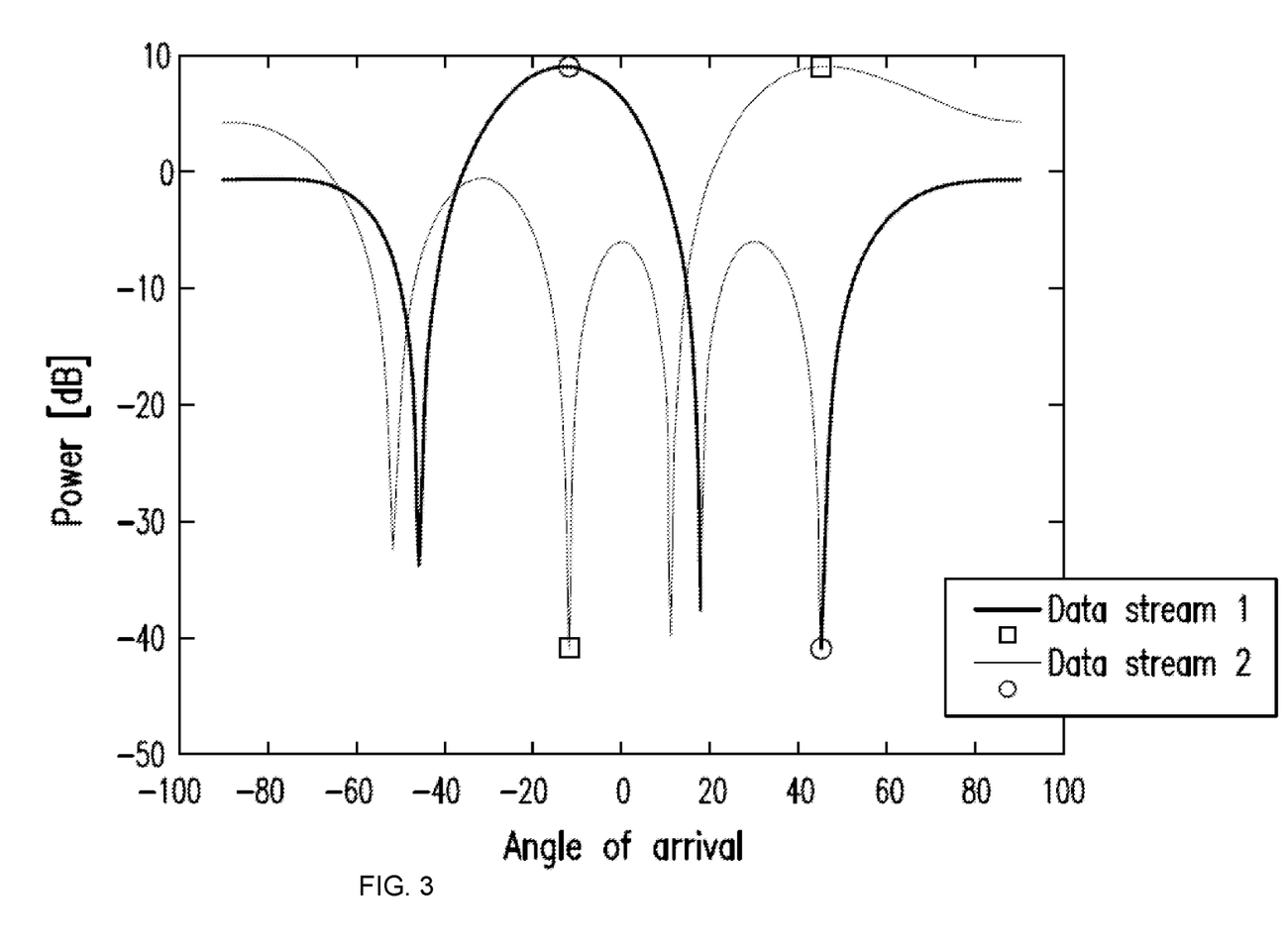
FIG. 3 illustrates a graph according to some embodiments.

A problem with the basic RAT transmission scheme (which embodiments address) stems from the fact that interfering transmission to one user onto another user is handled by "null-forming" in the estimated directions of interfered users. (Null-forming means that, essentially, in the estimated directions of interfered users, the beamforming weights are selected such that the resulting received power of the beam is low.) To illustrate the problem, consider a scenario with 4 TX antennas and one RX antenna per UE. In this example, UE1 is located at $\theta_1=45$ degrees and UE2 is located at $\theta_2=-15$ degrees relative to the boresight of the antenna. Assuming equal path loss and line-of-sight (LOS) propagation to both UEs, FIG. 3 illustrates the gain of pre-coded signal to UE1 and UE2, respectively, as a function of angle of arrival (e.g., azimuth angle). For this illustration, half-wavelength element spacing is assumed for the base station antenna elements. As shown in FIG. 2, received power (at the UE) is plotted for each UE (data stream 1 corresponding to UE1 and data stream 2 corresponding to UE2) as a function of the angle of arrival. As seen, received power for UE1 reaches a low (or "null") at $\theta_2=-15$ (i.e. the location of the interfering UE2); likewise, received power for UE2 reaches a low (or "null") at $\theta_1=45$ degrees (i.e. the location of the interfering UE1).

As can be seen (e.g., in FIG. 3), in the basic RAT transmission scheme, sharp nulls are placed at the directions of the other (interfering) UEs, e.g. in order to minimize cross-talking interference. However, this strategy is non-robust in the presence of channel estimation errors due to e.g. quantization of the precoding vector over multiple resource blocks. The consequence is that MU-MIMO performance deteriorates to an unacceptable level.

Embodiments provide for modifications of the basic RAT transmission scheme, such that: (1) the sharp and narrow nulls are replaced by smoother nulls; and (2) the associated computational complexity is low. Further, while modifications are discussed with respect to a particular transmission scheme (e.g., RAT), embodiments are also applicable with respect to other transmission schemes. In some embodiments, where the angular UE separation becomes comparable to the phase noise level, substantial performance gains over known methods are achievable.

According to a first aspect, a method is provided. The method includes computing a beamforming weight matrix W; and using the beamforming weight matrix W to transmit and/or receive data. The beamforming matrix W is computed from a weighted channel estimate matrix $\check{H}=\rho \circ \hat{H}$ and a channel estimation error matrix $\tilde{H}$, the weighted channel estimate matrix $\check{H}$ satisfying a condition, and where $\hat{H}$ is a channel estimate matrix and $\rho$ is a weighting factor matrix and $\circ$ denotes a matrix operation. The weighting factor matrix $\rho$ is such that zeroes of the rows or columns of the weighted channel estimate matrix $\check{H}$ are moved as compared to zeroes of the rows or columns of the channel estimate matrix $\hat{H}$.

In embodiments, the matrix operation $\circ$ denotes the Hadamard matrix product. In embodiments, the condition that the weighted channel estimate matrix $\check{H}$ satisfies is $\check{H}W+\tilde{H}W=I$, where I is the identity matrix. In embodiments, computing the beamforming weight matrix W includes estimating W based on a minimum mean squares error (MMSE) approximation method, and the estimate $W=\check{H}^* (\check{H}\check{H}^*+\Gamma)^{-1}$, where $\check{H}^*$ denotes the Hermitian of $\check{H}$ and $\Gamma$ is a covariance matrix of the channel estimation error matrix $\tilde{H}$, and where an MMSE criterion $E\{WW^*\}=I$ is used, E being the statistical expected value operator.

In embodiments, the weighting factor matrix $$\rho = \begin{pmatrix} 1 & \rho & \cdots & \rho^{N_{tx}-1} \\ \vdots & \vdots & \ddots & \vdots \\ 1 & \rho & \cdots & \rho^{N_{tx}-1} \end{pmatrix}$$

where ρ has dimension $N_{rx}$ by $N_{tx}$, where $N_{rx}$ is the number of receive antennas and $N_{tx}$ is the number of base station antennas, and ρ is a scalar. In embodiments, the weighting factor $$\rho = \begin{pmatrix} 1 & \rho_1 & \cdots & \rho_1^{N_{tx}-1} \\ \vdots & \vdots & \ddots & \vdots \\ 1 & \rho_{N_{rx}} & \cdots & \rho_{N_{rx}}^{N_{tx}-1} \end{pmatrix}$$

where ρ has dimension $N_{rx}$ by $N_{tx}$, where $N_{rx}$ is the number of receive antennas and $N_{tx}$ is the number of base station antennas, and each $\rho_i$ is a scalar. In embodiments, an absolute value of ρ and/or $\rho_i$ is strictly less than 1. In embodiments, an absolute value of ρ and/or $\rho_i$ is strictly greater than 1. In embodiments, an absolute value of $\rho_i$ is strictly less than 1 for a first set of values and an absolute value of $\rho_i$ is strictly greater than 1 for a second set of values, wherein the first and second sets of values are disjoint and include all values of $1 \le i \le N_{rx}$. In embodiments, computing the beamforming weight matrix W employs a Reciprocity Assisted Transmission (RAT) algorithm.

According to a second aspect, a device is provided. The device is adapted to compute a beamforming weight matrix W; and use the beamforming weight matrix W to transmit and/or receive data. The beamforming matrix W is computed from a weighted channel estimate matrix $\check{H}=\rho \circ \hat{H}$ and a channel estimation error matrix $\tilde{H}$, the weighted channel estimate matrix $\check{H}$ satisfying a condition, and where $\hat{H}$ is a channel estimate matrix and ρ is a weighting factor matrix and ∘ denotes a matrix operation. The weighting factor matrix ρ is such that zeroes of the rows or columns of the weighted channel estimate matrix $\check{H}$ are moved as compared to zeroes of the rows or columns of the channel estimate matrix $\hat{H}$.

According to a third aspect, a device is provided. The device includes a computing module configured to compute a beamforming weight matrix W; and a transceiver module configured to use the beamforming weight matrix W to transmit and/or receive data. The beamforming matrix W is computed from a weighted channel estimate matrix $\check{H}=\rho \circ \hat{H}$ and a channel estimation error matrix $\tilde{H}$, the weighted channel estimate matrix $\check{H}$ satisfying a condition, and where $\hat{H}$ is a channel estimate matrix and ρ is a weighting factor matrix and ∘ denotes a matrix operation. The weighting factor matrix ρ is such that zeroes of the rows or columns of the weighted channel estimate matrix $\check{H}$ are moved as compared to zeroes of the rows or columns of the channel estimate matrix $\hat{H}$.

According to a fourth aspect, a computer program is provided. The compute program includes instructions which, when executed on at least one processor, causes the at least one processor to carry out the method according to any one of the embodiments of the first aspect.

According to a fifth aspect, a carrier is provided. The carrier includes the computer program of the fourth aspect. The carrier is one of an electronic signal, optical signal, radio signal or computer readable storage medium.

BRIEF DESCRIPTION OF THE DRAWINGS

The accompanying drawings, which are incorporated herein and form part of the specification, illustrate various embodiments.

DETAILED DESCRIPTION

As discussed above, a problem with the basic RAT transmission scheme is that it is non-robust and that null-forming can lead to sharp and narrow nulls. One reason for this is because null-forming amounts to placing zeroes on the unit circle that represents the directions to the other UEs. Such zeroes, placed exactly on the unit circle, can lead to an antenna gain that is exactly 0 in exactly the estimated interfering direction. However, this also results in the antenna gain zeroes becoming extremely deep and narrow in the angular dimension, and therefore the zeroes become extremely sensitive to angular modeling errors like beam weight quantization errors and phase noise in transmitters and receivers. In addition, channel estimation errors in terms of the phase affects the performance of the resulting beams.

The presence of zeroes on the unit circle means that a polynomial associated with the precoding vector (i.e. where the precoding vector is viewed as a spatial polynomial having coefficients corresponding to the precoding vector elements), also has zeroes on the unit circle. This in turn means that polynomials associated with the channel matrix (i.e. where the polynomials have coefficients corresponding to the channel matrix elements) have zeroes on the unit circle. Embodiments attempt to broaden the nulls provided by null-forming in order to create more robust, predictable behavior. Specifically, embodiments provide for a modified channel matrix such that the zeroes of the polynomial associated with the modified channel matrix are moved inside the unit circle (or outside), i.e. the zeroes are moved to another circle with radius strictly less (or greater) than one. This ensures that there is always a final distance in the complex plane from the unit circle to the zero which prevents an exactly zero antenna gain corresponding to the zero of the associated polynomial.

The idea of null-forming amounting to placing zeroes on the unit circle is well understood in the field. A fuller explanation of this, and the effect of moving the zeroes inside (or outside) the unit circle is offered further below.

A weighting factor matrix ρ (for modifying a steering vector matrix W) is defined as follows:

$$\rho = \begin{pmatrix} 1 & \rho_1 & \cdots & \rho_1^{N_{tx}-1} \\ \vdots & \vdots & \ddots & \vdots \\ 1 & \rho_{N_{rx}} & \cdots & \rho_{N_{rx}}^{N_{tx}-1} \end{pmatrix} \quad \text{(Eq. 3)}$$

$$\rho = \begin{pmatrix} 1 & \rho & \cdots & \rho^{N_{tx}-1} \\ \vdots & \vdots & \ddots & \vdots \\ 1 & \rho & \cdots & \rho^{N_{tx}-1} \end{pmatrix} \quad \text{(Eq. 4)}$$

where $\rho$ or each of the $\rho_i$ is a non-zero scalar. (As can be seen, (Eq. 4) is a special case of (Eq. 3) where $\rho_i=\rho$ for all values of $0 \le i \le N_{rx}$. Also, note that the matrix $\rho$ is denoted by boldface, while the weighting factor $\rho$ or $\rho_i$ is an element of the matrix $\rho$.)

This matrix (i.e. $\rho$) has dimension $N_{rx}$ by $N_{tx}$ and the weighting factor $\rho_i$ typically meets $|\rho_i|<1$ (or $|\rho_i|>1$). The weighted channel matrix is then given by $\check{H}=\rho \circ \hat{H}$, where $\circ$ denotes the Hadamard matrix product (e.g., in its simplest form expressing element-wise matrix multiplication). The weighted channel matrix ($\check{H}$) can then be substituted for the unweighted version ($\hat{H}$) in (Eq. 2), resulting in:

$$W = \check{H}(\check{H}\check{H}^* + \Gamma)^{-1} \quad \text{(Eq. 5)}$$

Figure 4:
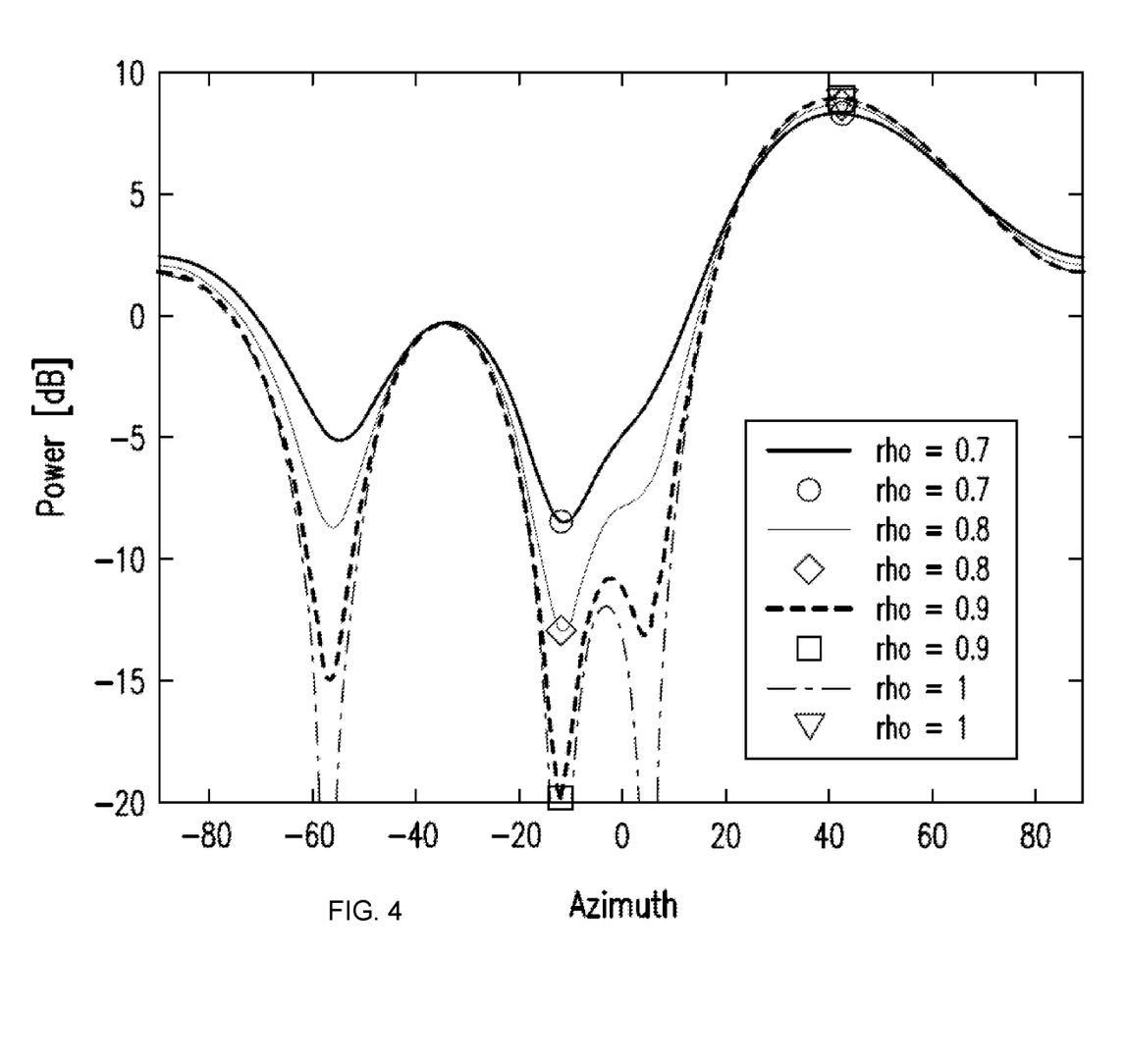
FIG. 4 illustrates a graph according to some embodiments.
Figure 5:
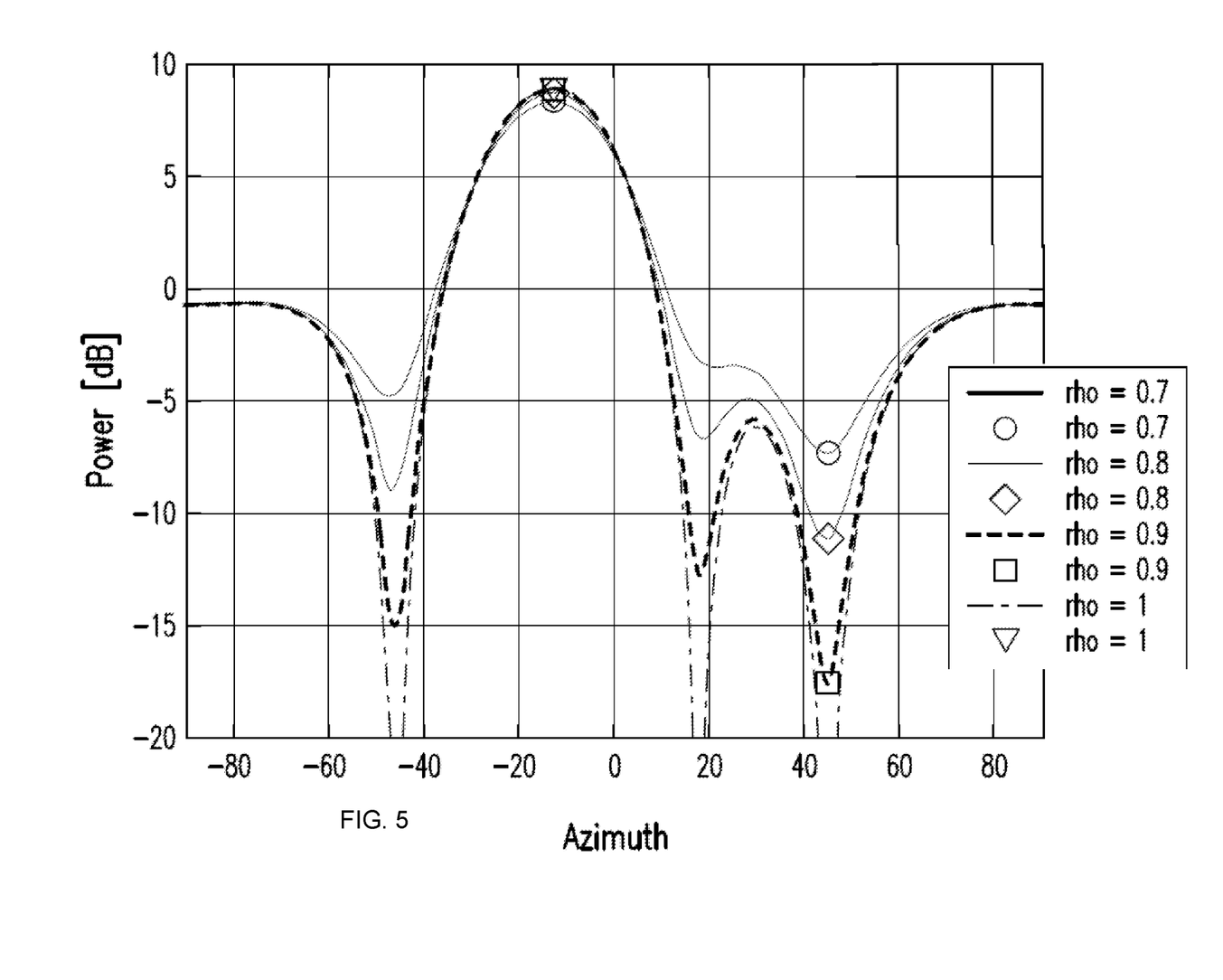
FIG. 5 illustrates a graph according to some embodiments.

FIGS. 4-5 illustrate advantages to using this weighted channel matrix. These figures continue the example of FIG. 3, where UE1 is located at $\theta_1=45$ degrees and UE2 is located at $\theta_2=-15$ degrees relative to the boresight of the antenna. In FIG. 4, showing the data stream corresponding to UE1, the null located at $\theta_2=-15$ degrees is smoothed for values of $\rho=0.7$, 0.8, and/or 0.9, relative to unity (i.e. unweighted). Likewise, in FIG. 5, showing the data stream corresponding to UE2, the null located at $\theta_1=45$ degrees is smoothed for values of $\rho=0.7$, 0.8, and/or 0.9, relative to unity (i.e. unweighted).

Values $|\rho|>1$ would have a similar effect, and embodiments also use such values. In embodiments, different values of $\rho$ for the weighted channel matrix may be used based on the particular subcarrier that the beamforming weights are being computed for. For instance, values of $|\rho|>1$ may be used for some subcarriers, and values of $|\rho|<1$ may be used for others. Likewise, where the matrix $\rho$ is based on (Eq. 3), the expression $|\rho_i|<1$ may hold for some values of i, and the expression $|\rho_i|>1$ may hold for other values of i. Mixing u$\Gamma_i$ or varying, the value of $\rho$ or $\rho_i$ in this manner may improve the general balancing of the beamforming computations. For example, numerical properties may be improved; that is, such mixing may create a wider range of values for the matrix, avoiding all the elements being smaller (for small values of $|\rho|$) or larger (for large values of $|\rho|$), which may have beneficial effects in some embodiments.

By using the weighting factor matrix $\rho$, zeroes (or nulls) are moved from the unit circle. In contrast, if a diagonal matrix e.g. for "regularization" were used instead, there would still be nulls on the unit circle, which would still lead to the problems identified above. Now that the weighting factor matrix has been introduced, the concept of moving zeroes (or nulls) from the unit circle will be explained in more detail.

Starting with the element-wise multiplication by $\rho$, and then factoring out the complex phase shifting caused by the antenna array time difference between elements, the product $\rho \circ \hat{H}$ can be expressed, for one row i, by an expression of the form $$\hat{H}_{\{i,0\}} + \rho \hat{H}_{\{i,1\}} e^{jQ} + \rho^2 \hat{H}_{\{i,2\}} e^{2jQ} + \ldots + \rho^{N_{tx}-1} \hat{H}_{\{i,N_{tx}-1\}} e^{(N_{tx}-1)jQ}$$

where Q represents a complex phase shifting factor, and j is the imaginary unit $\sqrt{-1}$.

Now, letting $z = e^{jQ}$, the expression above takes the form $$\hat{H}_{\{i,0\}} + \rho \hat{H}_{\{i,1\}} z + \rho^2 \hat{H}_{\{i,2\}} z^2 + \ldots + \rho^{N_{tx}-1} \hat{H}_{\{i,N_{tx}-1\}} z$$

which is a polynomial in z. The roots of this expression may be referred to as "zeroes," such as the zeroes that are discussed throughout this application. It is possible to refer to zeroes of rows or columns of the weighted channel estimate matrix. This is so because if we switch notation to one where we have transmit antennas indexed while going down a column (instead of a row i as illustrated above), then we get columns (instead of rows) and these equations are transposed.

Continuing with this notation, and applying it to the MMSE equation above (Eq. 2), results in the expression $$W = \check{H}(z)(\check{H}(z)\check{H}^*(z) + \Gamma)^{-1}$$

(That is, the matrices $\check{H}$ and $\check{H}^*$ can be considered as functions of the variable z previously introduced.) Since matrix inversion is essentially just a more complicated form of division, it follows that $\check{H}$ is a factor of W. In some circumstances, there may be some cancellation due $\Gamma$, however requiring that $\Gamma>0$ will prevent most such cancellation issues. This means that, typically, the zeroes of W are the same as those of $\check{H}$.

In cases where the channel is flat with all channel elements being the same, and we let $\rho=1$, then we can solve for the zeroes. Doing so, we get (for two representative values of $N_{tx}$):

$$1+z=0 \rightarrow z := -1 \text{ for } N_{tx}=2$$

$$1+z+z^2=0 \rightarrow z := -\tfrac{1}{2} \pm \tfrac{\sqrt{3}}{2}j \text{ for } N_{tx}=3$$

where the zeroes here (for $\rho=1$) are all on the unit circle.

For the same case where the channel is flat, but now letting $\rho<1$, we get (for two representative values of $N_{tx}$):

$$1+\rho z = 0 \rightarrow z := -\frac{1}{\rho} \qquad \text{for } N_{tx}=2$$

$$1+\rho z + \rho^2 z^2 = 0 \rightarrow z := -\frac{1}{2\rho} \pm \frac{1}{\rho}\sqrt{\frac{3}{4}} \, j \quad \text{for } N_{tx}=3$$

where the zeroes here (for $\rho<1$) are all at a distance $1/\rho$ from the unit circle.

Figure 6:
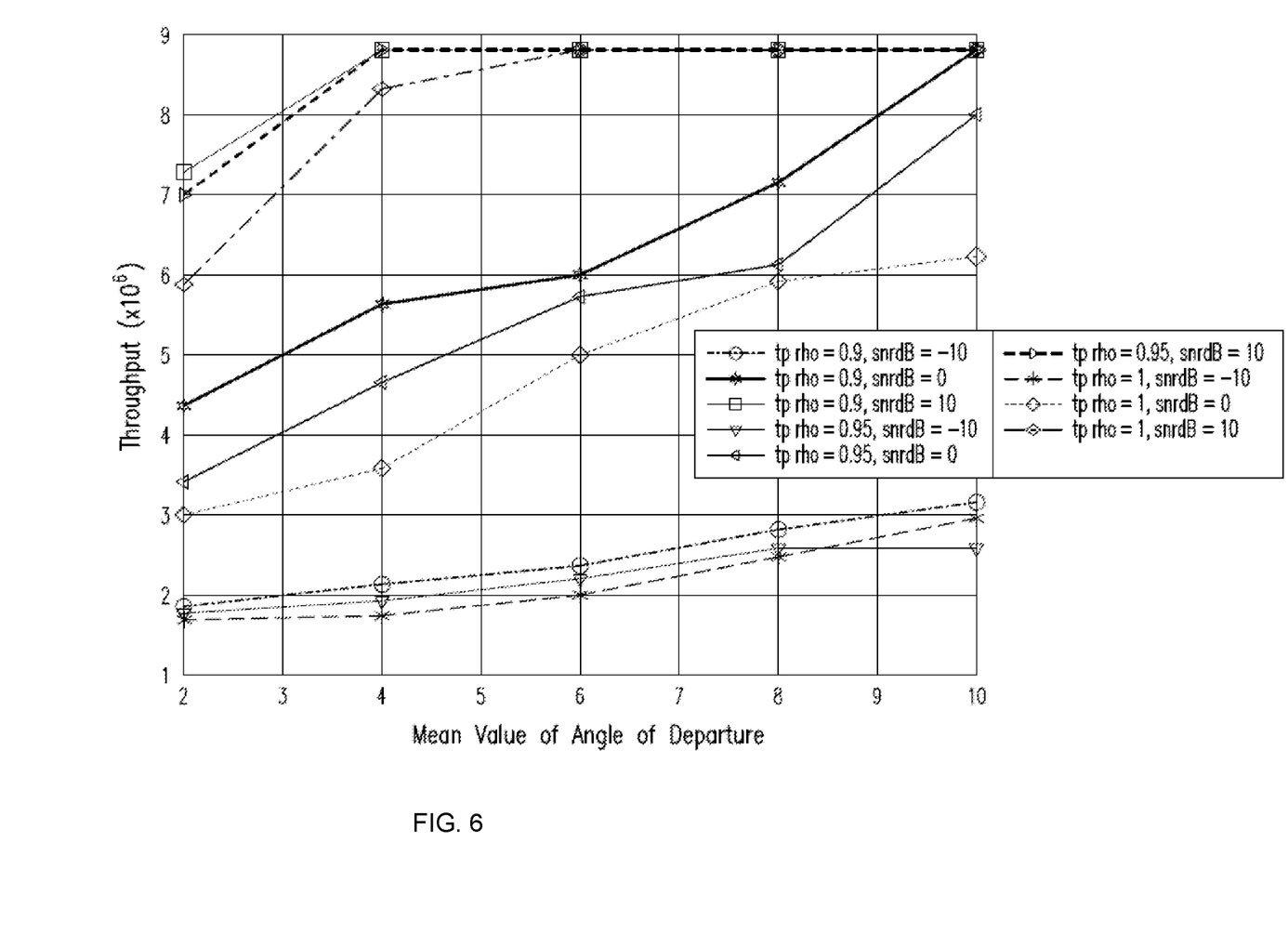
FIG. 6 illustrates a graph according to some embodiments.

FIG. 6 illustrates a chart graphing angle of departure versus throughput, according to some embodiments. As shown, different values of $\rho$ (0.9, 0.95, and 1) with different signal-to-noise ratios (0 dB and ±10 dB) are shown. The chart shows throughput using a modified RAT transmission scheme as described herein, and shows how this scheme affects the downlink capacity. To generate the graph, a combined link and system simulator was used. The simulator includes the complete reciprocity based beamforming chain in the eNB/gNB including channel estimation, link adaptation, outer loop, scheduling, beamforming computation, and modulation-and-coding scheme (MCS) selection. It also includes radio propagation modeling and modeling of the UEs. Specifically, the simulation used a scenario having where the eNB/gNB included 16 antenna elements and where the UEs each included 2 antenna elements. The angular UE separation was varied. It can be noted that (i) the theoretical maximum throughput is achieved when the antenna separation becomes large for high SNRs, and (ii) the performance is always better with weighting than without.

Finally note that the above represents a rank 1 (per UE) transmission case. This is the reason why two antennas in the UEs are enough to separate two data streams. In case of rank 2 transmission, the UEs would need four antennas in order to separate four data streams, and so on.

Figure 7:
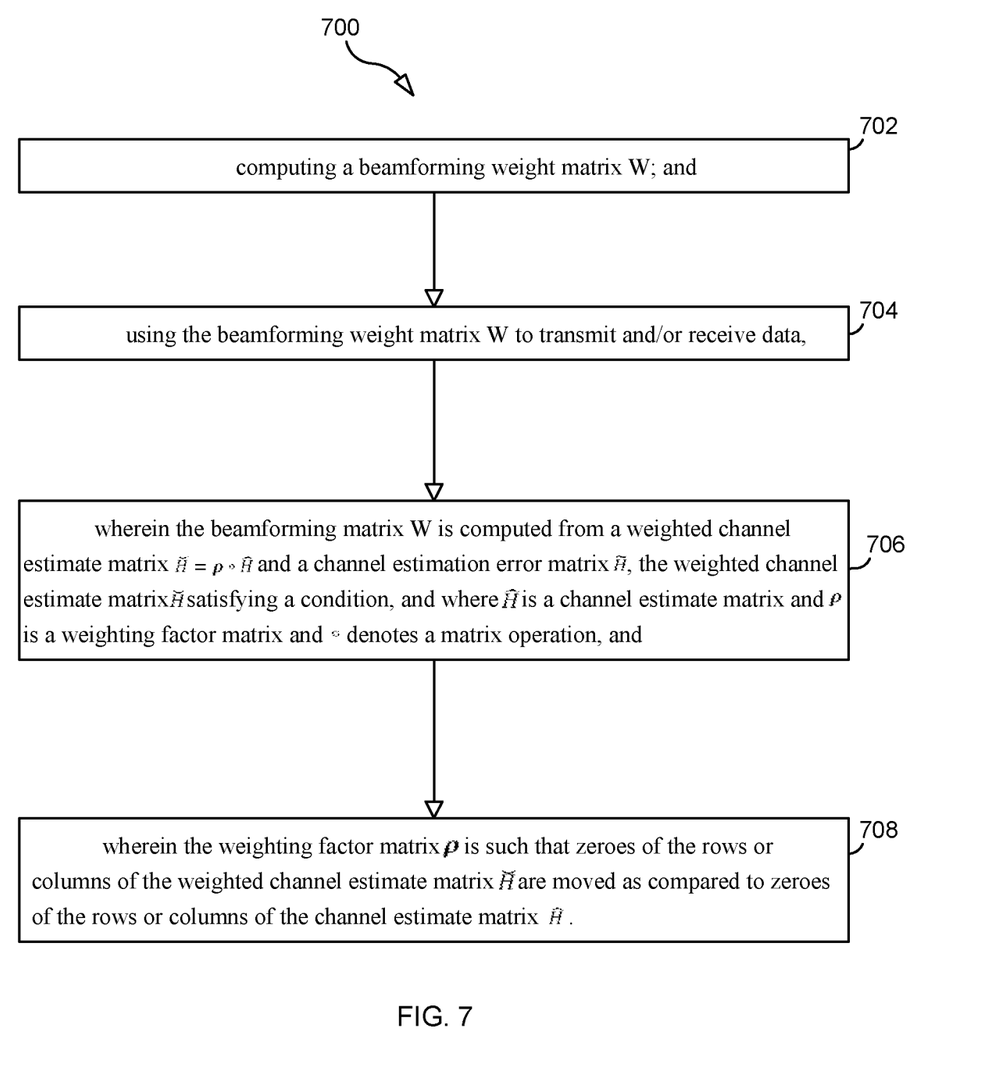
FIG. 7 illustrates a flow chart according to some embodiments.

FIG. 7 is a flow chart according to exemplary embodiments. Process 700 is a method that may be performed, for example, by a base station, such as an eNB or gNB and/or by radio processing circuitry. The method includes computing a beamforming weight matrix W (step 702). The method further includes using the beamforming weight matrix W to transmit and/or receive data (step 704). The beamforming matrix W is computed from a weighted channel estimate matrix $\check{H}=\rho \circ \hat{H}$ and a channel estimation error matrix $\tilde{H}$, the weighted channel estimate matrix $\check{H}$ satisfying a condition, and where $\hat{H}$ is a channel estimate matrix and $\rho$ is a weighting factor matrix and $\circ$ denotes a matrix operation (step 706). The weighting factor matrix $\rho$ is such that zeroes of the rows or columns of the weighted channel estimate matrix $\check{H}$ are moved as compared to zeroes of the rows or columns of the channel estimate matrix $\hat{H}$ (step 708).

In some embodiments, the matrix operation $\circ$ denotes the Hadamard matrix product. In embodiments, the condition that the weighted channel estimate matrix $\check{H}$ satisfies is $\check{H}W+\tilde{H}W=I$, where I is the identity matrix. In embodiments, computing the beamforming weight matrix W comprises estimating W based on a minimum mean squares error (MMSE) approximation method, and wherein the estimate $W=\check{H}(\check{H}\check{H}^*+\Gamma)^{-1}$, where $\check{H}^*$ denotes the Hermitian of $\check{H}$ and $\Gamma$ is a covariance matrix of the channel estimation error matrix $\tilde{H}$, and where an MMSE criterion $E\{WW^*\}=I$ is used, E being the statistical expected value operator.

In some embodiments, the weighting factor matrix $$\rho = \begin{pmatrix} 1 & \rho & \cdots & \rho^{N_{tx}-1} \\ \vdots & \vdots & \ddots & \vdots \\ 1 & \rho & \cdots & \rho^{N_{tx}-1} \end{pmatrix}$$

where $\rho$ has dimension $N_{rx}$ by $N_{tx}$, where $N_{rx}$ is the number of receive antennas and $N_{tx}$ is the number of base station antennas, and $\rho$ is a scalar. In embodiments, the weighting factor $$\rho = \begin{pmatrix} 1 & \rho_1 & \cdots & \rho_1^{N_{tx}-1} \\ \vdots & \vdots & \ddots & \vdots \\ 1 & \rho_{N_{rx}} & \cdots & \rho_{N_{rx}}^{N_{tx}-1} \end{pmatrix}$$

where $\rho$ has dimension $N_{rx}$ by $N_{tx}$, where $N_{rx}$ is the number of receive antennas and $N_{tx}$ is the number of base station antennas, and each $\rho_i$ is a scalar. In embodiments, an absolute value of $\rho$ and/or $\rho_i$ is strictly less than 1 (or strictly greater than 1). In embodiments, an absolute value of $\rho_i$ is strictly less than 1 for a first set of values and an absolute value of $\rho_i$ is strictly greater than 1 for a second set of values, wherein the first and second sets of values are disjoint and include all values of $1 \le i \le N_{rx}$.

In embodiments, computing the beamforming weight matrix W employs a Reciprocity Assisted Transmission (RAT) algorithm.

Figure 8:
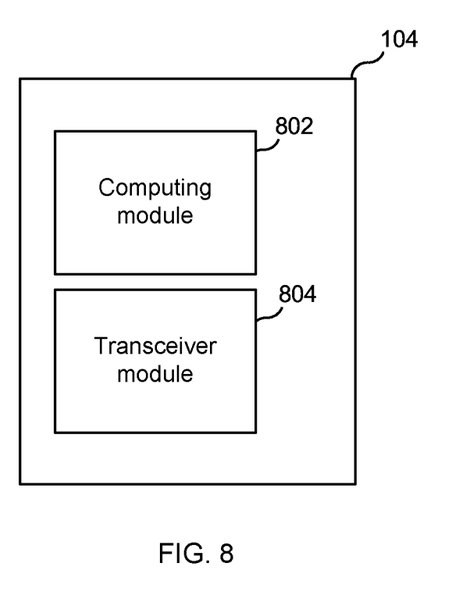
FIG. 8 is a diagram showing functional modules of a device according to some embodiments.
Figure 9:
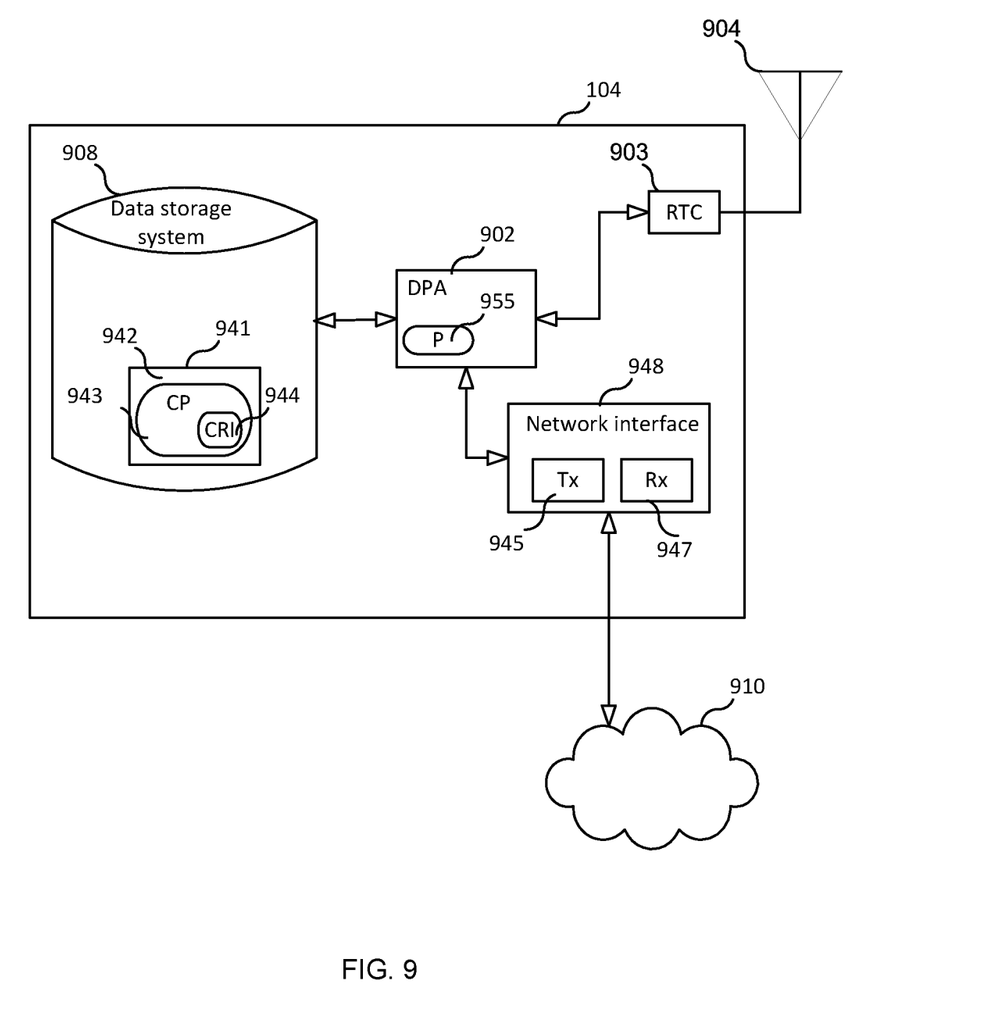
FIG. 9 is a block diagram of a device according to some embodiments.

FIG. 8 is a diagram showing functional modules of a device 104 according to some embodiments. As shown in FIG. 8, device 104 includes a computing module 802 and a transceiver module 804. The computing module is configured to compute a beamforming weight matrix W; and the transceiver module is configured to use the beamforming weight matrix W to transmit and/or receive data. The beamforming matrix W is computed from a weighted channel estimate matrix $\check{H}=\rho\circ\hat{H}$ and a channel estimation error matrix $\tilde{H}$, the weighted channel estimate matrix $\check{H}$ satisfying a condition, and where $\hat{H}$ is a channel estimate matrix and $\rho$ is a weighting factor matrix and $\circ$ denotes a matrix operation. The weighting factor matrix $\rho$ is such that zeroes of the rows or columns of the weighted channel estimate matrix $\check{H}$ are moved as compared to zeroes of the rows or columns of the channel estimate matrix $\hat{H}$ FIG. 9 is a block diagram of a device 104 according to some embodiments. As shown in FIG. 9, device 104 may comprise: a data processing apparatus (DPA) 902, which may include one or more processors (P) 955 (e.g., a general purpose microprocessor and/or one or more other processors, such as an application specific integrated circuit (ASIC), field-programmable gate arrays (FPGAs), and the like); a network interface 948 comprising a transmitter (Tx) 945 and a receiver (Rx) 947 for enabling device 104 to transmit data to and receive data from other nodes connected to a network 910 (e.g., an Internet Protocol (IP) network) to which network interface 948 is connected; circuitry 903 (e.g., radio transceiver circuitry) coupled to an antenna system 904 for wireless communication with UEs); and local storage unit (a.k.a., "data storage system") 908, which may include one or more non-volatile storage devices and/or one or more volatile storage devices (e.g., random access memory (RAM)). In embodiments where device 104 includes a general purpose microprocessor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, but not limited, to magnetic media (e.g., a hard disk), optical media, memory devices (e.g., random access memory, flash memory), and the like. In some embodiments, the CRI 944 of computer program 943 is configured such that when executed by data processing apparatus 902, the CRI causes device 104 to perform steps described above (e.g., steps described above with reference to the flow charts). In other embodiments, device 104 may be configured to perform steps described herein without the need for code. That is, for example, data processing apparatus 902 may consist merely of one or more ASICs. Hence, the features of the embodiments described herein may be implemented in hardware and/or software.

While various embodiments of the present disclosure are described herein (including the appendices, if any), it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method comprising:
   computing a beamforming weight matrix W; and
   using the beamforming weight matrix W to transmit or receive data;

wherein the beamforming matrix W is computed from a weighted channel estimate matrix $\check{H}=\rho \circ \hat{H}$ and a channel estimation error matrix $\tilde{H}$, the weighted channel estimate matrix $\check{H}$ satisfying a condition, and where $\hat{H}$ is a channel estimate matrix and $\rho$ is a weighting factor matrix and $\circ$ denotes a matrix operation; and wherein the weighting factor matrix $\rho$ is such that zeroes of the rows or columns of the weighted channel estimate matrix $\check{H}$ are moved as compared to zeroes of the rows or columns of the channel estimate matrix $\hat{H}$.

2. The method of claim 1, wherein the matrix operation $\circ$ denotes the Hadamard matrix product.

3. The method of claim 1, wherein the condition that the weighted channel estimate matrix $\check{H}$ satisfies is $\check{H}W+\tilde{H}W=I$, where I is the identity matrix.

4. The method of claim 1, wherein computing the beamforming weight matrix W comprises estimating W based on a minimum mean squares error (MMSE) approximation method, and wherein the estimated $W=\check{H}(\check{H}\check{H}^*+\Gamma)^{-1}$, where $\check{H}^*$ denotes the Hermitian of $\check{H}$ and $\Gamma$ is a covariance matrix of the channel estimation error matrix $\tilde{H}$, and where an MMSE criterion $E\{WW^*\}=I$ is used, where E is the statistical expected value operator.

5. The method of claim 1, wherein the weighting factor matrix $$\rho = \begin{pmatrix} 1 & \rho & \cdots & \rho^{N_{tx}-1} \\ \vdots & \vdots & \ddots & \vdots \\ 1 & \rho & \cdots & \rho^{N_{tx}-1} \end{pmatrix}$$

where the weighting factor matrix $\Gamma$ has dimension $N_{rx}$ by $N_{tx}$, where $N_{rx}$ is the number of receive antennas and $N_{tx}$ is the number of transmit antennas, and the weighting factor $\Gamma$ is a scalar.

6. The method of claim 1, wherein the weighting factor matrix $$\rho = \begin{pmatrix} 1 & \rho_1 & \cdots & \rho_{N_{rx}}^{N_{tx}-1} \\ \vdots & \vdots & \ddots & \vdots \\ 1 & \rho_{N_{rx}} & \cdots & \rho_{N_{rx}}^{N_{tx}-1} \end{pmatrix}$$

where the weighting factor matrix $\Gamma$ has dimension $N_{rx}$ by $N_{tx}$, where $N_{rx}$ is the number of receive antennas and $N_{tx}$ is the number of transmit antennas, and each weighting factor $\Gamma_i$ in the weighting factor matrix $\Gamma$ is a scalar.

7. The method of claim 6, wherein an absolute value of each weighting factor $\Gamma_i$ is strictly less than 1.

8. The method of claim 6, wherein an absolute value of each weighting factor $\Gamma_i$ is strictly greater than 1.

9. The method of claim 6, wherein an absolute value of each weighting factor $\Gamma_i$ is strictly less than 1 for a first set of values and an absolute value of each weighting factor $\Gamma_i$ is strictly greater than 1 for a second set of values, wherein the first and second sets of values are disjoint and include all values of $1 \leq i \leq N_{rx}$.

10. The method of claim 1, wherein computing the beamforming weight matrix W includes using a Reciprocity Assisted Transmission (RAT) algorithm.

11. A device comprising:
radio transceiver circuitry; and
radio processing circuitry configured to:
compute a beamforming weight matrix W; and
use the beamforming weight matrix W to transmit or receive data via the transceiver circuitry;
wherein the beamforming matrix W is computed from a weighted channel estimate matrix $\check{H}=\Gamma \circ \hat{H}$ and a channel estimation error matrix $\tilde{H}$, the weighted channel estimate matrix $\check{H}$ satisfying a condition, and where $\hat{H}$ is a channel estimate matrix and $\Gamma$ is a weighting factor matrix and $\circ$ denotes a matrix operation; and
wherein the weighting factor matrix $\Gamma$ is such that zeroes of the rows or columns of the weighted channel estimate matrix $\check{H}$ are moved as compared to zeroes of the rows or columns of the channel estimate matrix $\hat{H}$.

12. A non-transitory computer-readable storage medium storing computer program instructions which, when executed by at least one processor of a device, cause the device to:
compute a beamforming weight matrix W; and
use the beamforming weight matrix W to transmit or receive data;
wherein the beamforming matrix W is computed from a weighted channel estimate matrix $\check{H}=\Gamma \circ \hat{H}$ and a channel estimation error matrix $\tilde{H}$, the weighted channel estimate matrix $\check{H}$ satisfying a condition, and where $\hat{H}$ is a channel estimate matrix and $\Gamma$ is a weighting factor matrix and $\circ$ denotes a matrix operation; and
wherein the weighting factor matrix $\Gamma$ is such that zeroes of the rows or columns of the weighted channel estimate matrix $\check{H}$ are moved as compared to zeroes of the rows or columns of the channel estimate matrix $\hat{H}$.

* * * * *